United States Patent Office 3,068,267
Patented Dec. 11, 1962

3,068,267
PROCESS FOR PRODUCING TRIALKYL
PHOSPHITES
Thomas M. Beck and Harold Sorstokke, Homewood, Ill.,
assignors to Stauffer Chemical Company, New York,
N.Y., a corporation of Delaware
No Drawing. Filed June 27, 1960, Ser. No. 38,743
10 Claims. (Cl. 260—461)

This invention relates to an improved process for producing trialkyl phosphites.

In particular this invention relates to a process for producing trialkyl phosphites wherein a less than stoichiometric amount of a tertiary amine is used to remove hydrogen chloride from the reaction mixture and is then regenerated continuously in situ with ammonia in order to produce optimum reaction conditions.

The reaction of phosphorus trichloride and an alcohol in the presence of a tertiary amine to produce a trialkyl phosphite is well known in the art, see for instance Kosolapoff, Organophosphorus Compounds, p. 184 (John Wiley & Sons, 1958). There are certain disadvantages to this process, however, particularly with the lower trialkyl phosphites such as trimethyl phosphite where the amount of amine hydrochloride is large compared with the amount of the product formed due to the high molecular weight of the tertiary amine hydrochloride. There is also a difficult separation problem under these circumstances with a relatively small amount of liquid product and a large amount of solid by-products.

Numerous attempts have been made to improve upon this basic process, as illustrated by U.S. Patents 2,843,616; 2,848,474; 2,859,238; 2,863,905 and 2,678,940. In general, these patents have tried to improve this reaction by halting the attack of the hydrogen chloride upon the trialkyl phosphite. First and foremost then, has been an attempt to keep the reaction mixture on the alkaline side or at a pH above 7.0. This has been done by adding expensive tertiary amines as HCl acceptors or even adding ammonia directly to the charge to react with the HCl directly. This latter process has the disadvantage of requiring extremely careful and constant process control since slight excesses of ammonia will react with the $PCl_3$ to reduce yields by forming amidophosphites whereas slight deficiencies of ammonia will allow deleterious HCl attack of the alkyl phosphite as discussed previously.

We have now found that it is possible to produce trialkyl phosphites by reacting $PCl_3$ and alcohol at pH's as low as 2.5 with good process control and excellent yield. In order to accomplish this we add less than the stoichiometric amount of certain tertiary amines to the alcohol in an inert solvent and then, while adding $PCl_3$ continuously, we add anhydrous ammonia. By using this technique, process control is greatly improved. The hydrogen chloride formed first reacts with the tertiary amine to form an amine hydrochloride. This latter compound is then continuously reacted with ammonia to regenerate the amine. By this means there is a continuous supply of tertiary amine present to react with the HCl evolved, yet the cost of using stoichiometric amounts of the amine as in the prior art is avoided. Likewise there is always amine hydrochloride present to react with ammonia so the prior art difficulty of forming amidophosphites is avoided. Thus by the use of a suitable tertiary amine both the dangers of acid attack by HCl and amidophosphite formation by free ammonia are avoided.

In order that this new process function properly, we have found that it is necessary to use a tertiary amine having a pK greater than ammonia. Ammonia has a pK in the range of 4.70 to 4.85 under the process conditions which we prefer to use. Therefore, suitable tertiary amines would be those with a pK of at least 5. Thus pyridine pK=8.7, α picoline pK 7.5, quinoline pK 9.0, dimethyl aniline pK 9.0 and diethylaniline pK 7.6 are among those tertiary amines suitable for our invention.

We have found that in a system employing one of the above tertiary amines in an inert solvent this reaction will produce mixtures having a pH within the range of 2.90 to 5.5. Thus our preferred operating conditions are in the range of pH 3 to 6.

As soon as any free ammonia is allowed to be present the pH jumps immediately above 7.0 and may go as high as 9 to 10 with as little as 5% free ammonia. Likewise the presence of free HCl drops the pH below 2.5.

Suitable inert solvents for use in this process include diethyl ether, hexane, ortho dichlorobenzene, methylene chloride, benzene and similar well known compounds.

We find that the amount of tertiary amine used if preferably from 2 to 10% of the stoichiometric amount necessary to react with the HCl formed. Amouns as great as 20% of stoichiometric may be used satisfactorily. Obviously any amount substantially less than stoichiometric may be used with some advantage over the prior art. However, as the amount increases the prior art difficulties previously discussed are encountered.

The following examples illustrate the process of our invention:

*Example 1*

A one liter 4-necked flask equipped with a stirrer, thermometer, dropping funnel and gas inlet and outlet tubes was charged with 400 ml. of anhydrous ethyl ether, 50.4 g. (1.575 moles) of methanol, and 12.0 g. (0.15 mole) of pyridine. A solution of 69 g. (0.5 mole) of $PCl_3$ in 45 ml. ether was then placed in the dropping funnel. The contents of the flask were stirred and cooled to 0° C. by means of an ice-salt bath and the $PCl_3$ solution was added gradually. Immediately after starting the $PCl_3$ addition, gaseous ammonia was passed into the mixture to regenerate the reacted pyridine. These two additions were then maintained at such a rate that the temperature was held between 0° and 5° C., and the pH was held between 3 and 6, thereby precluding the presence of either acid or free ammonia. When the addition was complete, 290 g. of 8.5% aqueous ammonia was added and stirred with the ether solution for 30 minutes at 5°–10° C. The organic layer was separated and distilled. After removing most of the ether at atmospheric pressure, the remainder was distilled at a pressure of 75 mm. of mercury to give 48.6 g. of a fraction distilling at 45°–50° C. This material was found to be 85.9% trimethyl phosphite and the balance pyridine. This represents a yield of 67.5% of theory.

*Example 2*

A flask equipped as in Example 1 was charged with 450 ml. anhydrous ethyl ether, 50.4 g. (1.575 moles) methanol, and 11 g. diethyl aniline (0.074 mole). This was stirred at 0°–5° and a solution of 69 g. of phosphorus trichloride (0.5 mole) and 45 ml. of ethyl ether was added gradually at this temperature. After the start of the addition, gaseous ammonia was added at such a rate that neither free acid nor free ammonia were present and the diethylaniline was continuously regenerated. When the addition was complete, the mixture was stirred for 30 minutes at 0°–10° C. with 290 g. of 8.5% aqueous ammonia. The ether layer was then separated and distilled, first at atmospheric pressure to remove most of the ether, then at 75 mm. of Hg pressure. A 44.1 g. fraction distilling at 48°–51° C. was obtained. This was shown by analysis to be 97.5% trimethyl phosphite, representing a yield of 69.5%. The residue distilled completely to give 10.0 g. of diethyl aniline.

A similar experiment carried out under identical conditions except for the absence of diethyl aniline gave a yield of 47.0% of trimethyl phosphite. The residue weighed 8.0 g. and analyzed as 26.8% phosphorus which represents 14% of the phosphorus trichloride used.

*Example 3*

A flask equipped as in Example 1 was charged with 450 ml. of ethyl ether, 50.4 g. of methanol (1.575 moles), and 11.0 g. of diethylaniline (0.075 mole). To this was added a mixture of 69 g. of phosphorus trichloride (0.5 mole) and 45 ml. of ethyl ether at a temperature between $-30°$ and $-40°$ C. As the reaction progressed, gaseous ammonia was added to regenerate the diethylaniline and control the pH between 3 and 6. When the reaction was complete the mixture was warmed to $-10°$ C. and stirred for 30 minutes with 290 g. of 8.5% aqueous ammonia at $0°-5°$ C. The ether layer was then separated and distilled to give 40.8 g. of trimethyl phosphite of 97.5% purity which distilled at $45°-52°$ C. at 75 mm. of Hg pressure. This represents a yield of 64.0%. Eleven grams of diethylaniline was recovered.

A similar experiment at $-30°$ to $-40°$ C., but with no diethylaniline, gave a yield of 51.5% trimethyl phosphite and an undistillable residue.

*Example 4*

In a flask equipped as in Example 1 a solution of 69 g. of phosphorus trichloride (0.5 mole) in 45 ml. of ethyl ether was added to a vigorously stirred mixture of 450 ml. of ethyl ether, 50.4 g. of methanol (1.575 moles), and 11 g. of diethylaniline at $-18°$ to $-24°$ C. After the start of the addition, gaseous ammonia was added at a rate sufficient to regenerate the diethylaniline. When the addition was complete, the mixture was stirred 30 minutes at $0°-5°$ C. with 290 g. of 8.5% aqueous ammonia. The ether layer was separated and distilled to give 45.4 g. of trimethyl phosphite of 97.5% purity distilling at $45°-52°$ C. at 75 mm. Hg. This represents a yield of 73.2%.

*Example 5*

In a flask equipped as in Example 1, a solution of 69 g. (0.5 mole) of phosphorus trichloride in 50 ml. of hexane was added at $0°-5°$ C. to a vigorously stirred mixture of 200 ml. of hexane, 215 g. of 2-ethylhexanol (1.65 moles), and 12 g. of pyridine (0.15 mole). Gaseous ammonia was introduced after the start of the reaction at a rate sufficient to regenerate the pyridine and control the pH at 3 to 6. When the addition was complete, the mixture was stirred for 30 minutes with 290 g. of 8.5% aqueous ammonia. The organic layer was stripped of hexane, excess 2-ethylhexanol, and pyridine by heating at 100° C. and reducing the pressure eventually to 1 mm. of Hg. The tri(2-ethylhexyl) phosphite product weighed 164 g. (78.6% of theory), and had a density of 0.899 g./cc. and a refractive index $N_D^{25}=1.4456$.

*Example 6*

In a flask equipped as in Example 1, a solution of 69 g. of phosphorus trichloride in 45 ml. of orthodichlorobenzene was added at $0°-5°$ C. to a mixture of 450 ml. of orthodichlorobenzene, 50.4 g. of methanol, and 9.1 g. of dimethylaniline. Gaseous ammonia was introduced during the reaction at a rate sufficient to regenerate the dimethylaniline and keep the pH between 3 and 6. The reaction took one hour and forty-five minutes after which the reaction mixture was washed with 100 ml. of concentrated NH$_4$OH in 200 ml. of water. The resulting organic layer was then distilled to remove solvent and volatiles and a product fraction weighing 44.0 g. distilling at $45°-60°$ C. at 60 mm. of Hg was collected. This analyzed to be 94.8% trimethyl phosphite which represents a 71% yield.

We have found that this combination of orthodichlorobenzene and dimethylaniline is particularly preferred in large scale plant production. In making 1,000 gallon batches solvent and amine relacement per charge has been less than two percent.

In performing the above examples we have used a temperature range of $-40°$ C. to $10°$ C., however, we have also performed large scale experiments with more efficient cooling and stirring using temperatures up to $25°-30°$ C. with consistent results of over 70% yield. Although the yield appears to drop off at higher temperature there is no precise upper temperature limit except that imposed by decomposition or boiling of the reactants or solvents. It is generally true that the lower esters are more easily made at the lower temperatures.

This process is applicable to trialkyl phosphites in general but is more valuable with the lower alkyl phosphites since the usual problems encountered are more difficult to overcome when making the lower esters. The process is particularly advantageous when making the methyl through octyl esters.

Although the above examples have shown batch reactions, we have found that this process may also be run on a semi-continuous or continuous basis. In this case the alcohol is also added continuously as a third stream in addition to the ammonia and phosphorus trichloride streams. Under these conditions nearly stoichiometric quantities are present at all times.

The foregoing detailed description is given for clearness of understanding only and no unnnecessary limitations should be derived therefrom.

We claim:

1. In the process of producing trialkyl phosphites by reacting phosphorus trichloride with an alcohol in an inert solvent using a tertiary amine as the hydrogen chloride acceptor, the improvement which comprises using 2 to 10% of the stoichiometric amount of a tertiary amine having a pK greater than that of ammonia, and continuously regenerating said tertiary amine during the reaction by the addition of anhydrous ammonia at a pH of from 2.5 to 6.

2. The process of claim 1 wherein the reaction takes place at $-40°$ C. to 30° C.

3. The process of claim 1 wherein the tertiary amine is dimethylaniline.

4. The process of claim 1 wherein the tertiary amine is pyridine.

5. The process of claim 1 wherein the tertiary amine is diethylaniline.

6. In the process of producing trialkyl phosphites by reacting phosphorus trichloride with an alcohol in an inert solvent using a tertiary amine as the hydrogen chloride acceptor, the improvement which comprises using 2 to 20% of the stoichiometric amount of a tertiary amine having a pK greater than ammonia and continuously regenerating said tertiary amine during the reaction by the addition of anhydrous ammonia at a pH of from 2.5 to 6.

7. The process of claim 6 wherein the reaction takes place at $-40°$ C. to 30° C.

8. The process of claim 6 wherein the tertiary amine is dimethylaniline.

9. The process of claim 6 wherein the tertiary amine is pyridine.

10. The process of claim 6 wherein the tertiary amine is diethylaniline.

References Cited in the file of this patent

UNITED STATES PATENTS

| | | |
|---|---|---|
| 2,678,940 | Boyer et al. | May 18, 1954 |
| 2,864,847 | Mangham | Dec. 16, 1958 |
| 2,905,705 | Kohler et al. | Sept. 22, 1959 |